United States Patent
Ajoy

(10) Patent No.: US 10,958,418 B2
(45) Date of Patent: Mar. 23, 2021

(54) SYSTEM AND METHOD FOR A BLOCKCHAIN NETWORK WITH HETEROGENEOUS PRIVACY

(71) Applicant: Chromata Corporation, Redmond, WA (US)

(72) Inventor: Atul Ajoy, Redmond, WA (US)

(73) Assignee: Chromata Corporation, Redmond, WA (US)

( * ) Notice: Subject to any disclaimer, the term of this patent is extended or adjusted under 35 U.S.C. 154(b) by 370 days.

(21) Appl. No.: 16/156,789

(22) Filed: Oct. 10, 2018

(65) Prior Publication Data
US 2019/0109707 A1    Apr. 11, 2019

Related U.S. Application Data

(60) Provisional application No. 62/570,465, filed on Oct. 10, 2017.

(51) Int. Cl.
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3213* (2013.01); *H04L 9/3234* (2013.01); *H04L 9/3239* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2016/0330034 A1* | 11/2016 | Back | H04L 9/3255 |
| 2017/0331896 A1* | 11/2017 | Holloway | H04L 9/12 |
| 2018/0025435 A1* | 1/2018 | Karame | H04L 9/3236 705/30 |

* cited by examiner

*Primary Examiner* — Fatoumata Traore
(74) *Attorney, Agent, or Firm* — Rowan TELS LLC

(57) ABSTRACT

A blockchain is configured with a public mainchain connected to a plurality of private sidechains. Access is controlled to the private sidechains through an access controller allowing transactions in the sidechain to be trusted implicitly. Data parity may be maintained between the mainchain and sidechains through the use of a parity controller configured by a user.

8 Claims, 13 Drawing Sheets

SYSTEM AND METHOD FOR A BLOCKCHAIN NETWORK WITH HETEROGENEOUS PRIVACY

CROSS-REFERENCE TO RELATED APPLICATIONS

This application claims the benefit of U.S. Provisional Application No. 62/570,465, filed Oct. 10, 2017, the entire contents of which are incorporated herein by reference.

BACKGROUND

The development of distributed ledgers in the form of blockchains has allowed for the creation of cryptocurrencies as well as new ways to store and authenticate information. This has led to the development of various different public and private versions of blockchains utilizing a plethora of consensus algorithms for the verification and hashing of information stored in blocks within the blockchain. Most recently, the infrastructure for blockchains has been expanded to allow for the creation of distributed virtual machines utilizing sandboxed virtual environments in participating computing devices. Various implementations of cryptocurrencies have made an effort to maintain parity with fiat currencies by pegging the value of the cryptocurrency to that of the fiat currency. These efforts have proved to be hugely expensive owing to the requirement to lock up an amount of fiat currency to ensure the pegged cryptocurrency's parity. Despite strides in the area of pegged cryptocurrencies, the gap between private and public blockchains remains large, with an inefficient disparity in the resolution of permissions between the public and private blockchains.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
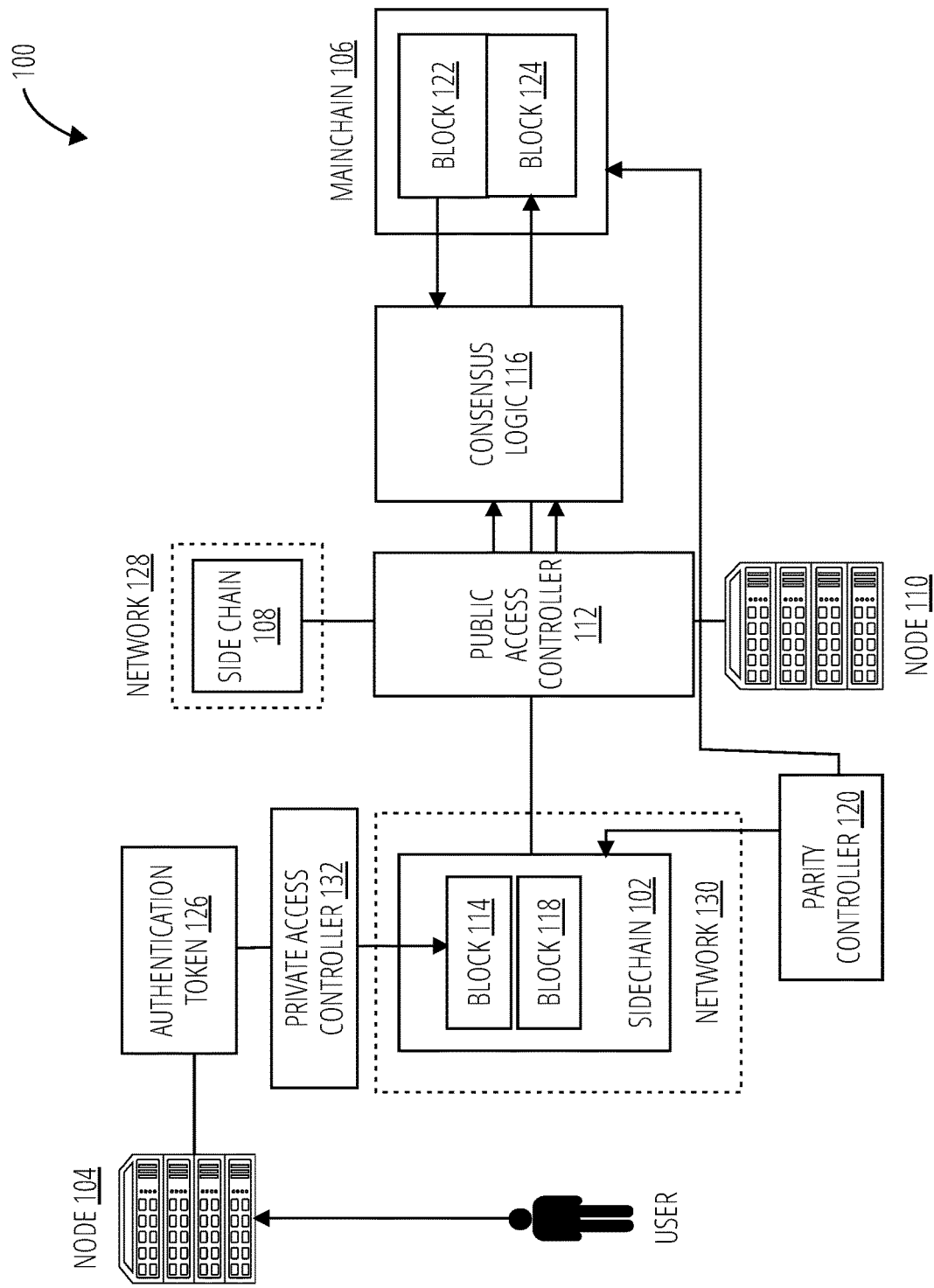
FIG. 1 illustrates an embodiment of a heterogeneous blockchain network 100.

"Mainchain" in this context refers to a distributed ledger, e.g. a public list of records (blocks) securely linked together utilizing cryptography and employing consensus logic for the validation of blocks of records. For example, a blockchain. The mainchain may be distributed over multiple computing devices (nodes) in a Wide Area Network (WAN).

"Sidechain" in this context refers to a private list of records (blocks) securely linked together utilizing cryptography and utilizing trust inherent to a user account for the validation of blocks of records.

"Consensus logic" in this context refers to logic to establish an agreed-upon value for a data hash to confirm the authenticity of a block. Consensus logic may be implemented with any consensus algorithm known in the art, for example, Proof of Work.

"Access controller" in this context refers to logic to restrict access to a permissioned system, for example, a sidechain. The logic may require certain standards in order for trust to be established to an individual for access to a system. For example, the access controller may require public/private key authentication, or a password with at least 30 bits of entropy and verification of a user's credentials by an administrator of the permissioned system.

```
accessController(userName){
        if (userName.loginAttempt == currentUser){grantAccess =
true;}if(userName == unknownUser){ if(administratorPermission ==
true && authentication == accepted){
                grantAccess = false;
        }
    }else{
                grantAccess = false;
        }
}
```

"Parity controller" in this context refers to logic to control the mirroring of data between two blockchains, for example, a mainchain and a sidechain, or multiple sidechain. The logic may be configured by the user to copy data from the sidechain to the mainchain or vice-versa.

```
parityController(dataLocation,dataDestination){
    if (change in data at dataLocation){
        data.dataDestination = data.dataLocation;
    }
}
```

"Public" in this context refers to a system or data collection open to access by any user with an account, public assets are accessible by the entire set of users.

"Private" in this context refers to a system or data wherein access is restricted to a limited subset of users particular to the specific to the accessed data or network, users accessing private networks or data must authenticate via an access controller.

The system utilizes sandboxed environments on nodes to create a stateful virtual machine to apportion computing and storage resources for the execution of distributed applications. A computing device, for example, a server, personal computer or smart device, may act as a node on the blockchain network. The main blockchain network (mainchain) contain smaller collections of nodes on smaller networks (sidechain) as well as multiple individual nodes. The mainchain is a publicly-accessible blockchain with a consensus algorithm to create trust while, the sidechain are private permissioned blockchains that do not have a consensus algorithm. On the mainchain, the system utilizes consensus logic, for example, proof-of-stake (PoS) to achieve consensus between nodes, validate transactions and create new blocks. The creator of the next block may be chosen in a deterministic (pseudo-random) way, and the chance that a user's account is chosen may depend on the account's stake. Stake may be determined, for example by the amount of currency an account has within the system (for example cryptocurrency, or standard currency), or the system may employ another measure to determine a user or organization's stake, for example, the amount of computing resources made available to the entire network.

The system may employ a controlled access layer which allows the system to establish trust for the purposes of block verification. The system may utilize any method well known in the art to authenticate users in the controlled access layer may utilize any means of authentication known in the art. Once authenticated, an organization's administrative users may control access to that organization's sidechain. A user may access the organization's sidechain with their credentials and access the decentralized applications that run on it. Once granted access, a user may then also build decentralized applications for execution on the sidechain or the main blockchain. The trust of a sidechain may be imputed to members within the sidechain. For example, an individual who uses credentials to log in to a network and access a sidechain may have the trust from the side chain imputed to them. Additionally, sidechain administrators may allocate compute resources from nodes within an organization to allow the allocation of compute resources within the organization and side chain as well as to the publicly accessible mainchain. The system may be utilized for the deployment of decentralized applications that run on networked computers. The nodes provide access to the blockchain which has a publicly-accessible mainchain where decentralized applications may run to be accessed by the public and privately-accessible sidechain that act as a place for organization administrators to build decentralized apps and manage their organization. The system may utilize the intelligent subsystems to manage the deployment of decentralized apps including the encryption, sharing, and distribution. The system may utilize a hashing system, for example a Merkle-Patricia-tree (trie), to structure stored data. The system may utilize a list of established values to allocate computing power for given tasks, this may be arrived at through consensus of participants within the networks. The system may intelligently estimate the compute cost of executing a decentralized application, for example, the system may use the number of computing cycles or instructions necessary to complete a task to estimate the compute cost. The system may actively adapt and apply machine learning techniques well known in the art to increase the efficiency of the distribution and execution of distributed applications. While the side chain may utilize inherent permissioning to authenticate users, the resources of network nodes hosting the sidechain may be allocated to the consensus algorithm for the mainchain, as well as to mainchain distributed computing tasks. Administrators of an organization may elect to use an organization's network node computing power for mainchain consensus algorithm processing and distributed application execution and may create value for the organization. The system may allow users to peg data in a sidechain to the mainchain, or peg data in the mainchain to the sidechain. The system may implement this by utilizing data mirroring, parity tracking or other methods known in the art.

This disclosure presents a new layer of blockchain/sidechain infrastructure. The existing blockchain technology includes a single blockchain with network surrounding it. Therefore, there are problems related to scalability and privacy. This disclosure provides multiple blockchains interacting with each other, thus building an eco-system of blockchains. For example, a mainchain may be publicly available and open to public inputs and a sidechain may be privately available for a business or organization. Using a sidechain network, an organization may build its own application (ERP,CRM) on it and decide whether the application will be used by a business itself or the customers of the business, thus improving privacy.

Referencing FIG. 1, the heterogeneous blockchain network 100 comprises a sidechain 102, a node 104, a mainchain 106, a side chain 108, a node 110, a public access controller 112, a consensus logic 116, an authentication token 126, a network 128, a network 130, a parity controller 120 and a private access controller 132.

The network 130 further comprises a sidechain 102. The 102 further comprises a block 114, and a block 118. The network 128 further comprises a side chain 108. The side chain 108 further comprises a block 122, and a block 124.

A node 104 authenticates to the private access controller 132 by transmitting an authentication token 126. The private access controller 132 receives the authentication token 126 and allows access to the sidechain 102 stored on the network 130 The node 104 records data in the block 114 which is hashed from the block 118 and the block 114 is verified and recorded to the sidechain 102 based on trust imputed to node 104 from the user's authentication. The node 110 the network 130 and the network 128 are treated as single nodes within the heterogeneous blockchain network 100, and the network 128, the node 110 and the network 130 connect to the mainchain 106 by authenticating via the public access controller 112. The node 110, transmits data to the mainchain 106 to be recorded in the block 124, the network 128 transmits data from the side chain 108 to the mainchain 106 to be recorded in the block 124, and the network 130 transmits data from the sidechain 102 to the mainchain 106 be stored in the block 124. The consensus logic 116 validates the data transactions from the node 110, the network 128 and the network 130 and hashes the block 124 based in part on the hash value of the block 122. The parity controller 120 transmits data between the sidechain 102 and the mainchain 106 to maintain a data mirroring between the mainchain 106 and the sidechain 102.

A blockchain network may include a mainchain, a group of sidechains, a public access controller operating cooperatively with consensus logic, gating public inputs to the mainchain. Each one of the group of sidechains is configured for operation without the intervention of the consensus logic, and instead utilizes a private access controller enabling only private permissioned inputs to each one of the group of sidechains. A parity controller may be employed between the mainchain and the group of sidechains to control parity between the mainchain and the group of sidechains. Each one of the group of sidechains may have an individual instance of the private access controller associated with it. Each one of the group of sidechains is hosted on a private network. The private network hosting each one of the group of sidechains may be considered a single node in the blockchain network.

If the sidechain attempts to fraud the system, the parity controller 120 is used to find the true valid sidechain. If the side chain is not valid, the sidechain needs to interact with the mainchain in order to interact with another sidechain.

Figure 2:
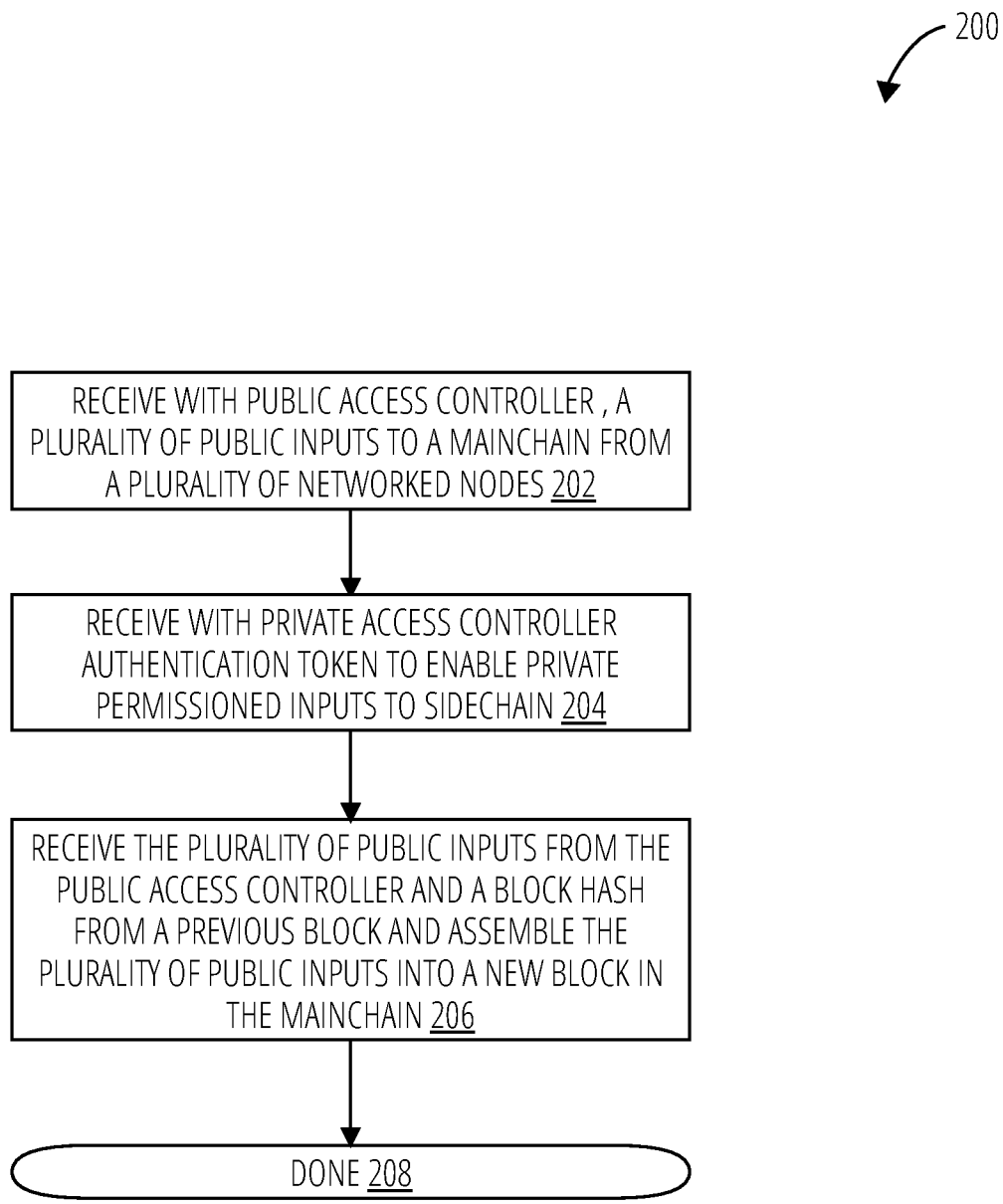
FIG. 2 illustrates an embodiment of a process for implementing a blockchain network with heterogeneous privacy 200.

The heterogeneous blockchain network 100 may be operated in accordance with the process detailed in FIG. 2.

Referencing FIG. 2, the process for implementing a blockchain network with heterogeneous privacy 200 receives a plurality of public inputs to a mainchain from a plurality of networked nodes (block 202).

The process for implementing a blockchain network with heterogeneous privacy 200 receives an authentication token to enable private permissioned inputs to a sidechain (block 204).

The process for implementing a blockchain network with heterogeneous privacy 200 receives the plurality of public inputs from the public access controller and a block hash from the previous block and assembles the plurality of public inputs into a new block in the mainchain (block 206) after which the process is complete (done block 208).

A method of implementing a blockchain network may include receiving with public access controller, a group of public inputs to a mainchain from a group of networked nodes, receiving with a private access controller an authentication token to enable private permissioned inputs to the sidechain and/or receiving with the consensus logic, the group of public inputs from the public access controller and a block hash from a previous block and assembling the group of public inputs into a new block in the mainchain.

The nodes may include at least one computing device and/or at least one a private network hosting a sidechain. The sidechain may be configured for operation without the intervention of consensus logic. A parity controller may be employed between the mainchain and a group of sidechains to control parity between the mainchain and the group of sidechains. Each one of the sidechains may optionally have an individual instance of the private access controller associated with it. The private network hosting each one of the sidechains may be considered a single node in the blockchain network. Data for the sidechains and the mainchain may be stored in virtual environments on the nodes within the blockchain network. Computing resources for the virtual environments on the nodes may be accessible by the blockchain network for the execution of distributed applications.

Figure 3:
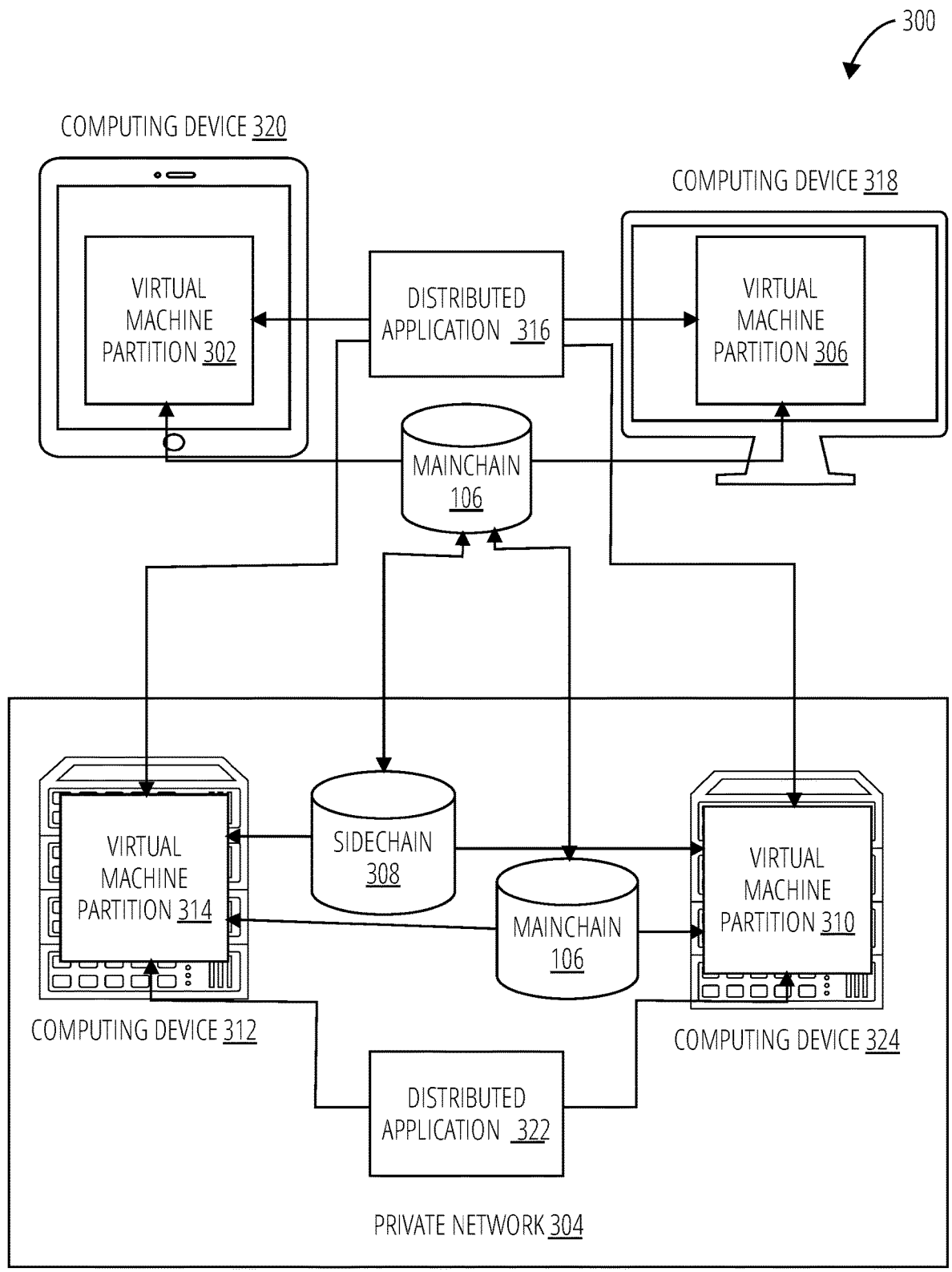
FIG. 3 illustrates an embodiment of a heterogeneous blockchain network 300.

Referencing FIG. 3, the heterogeneous blockchain network 300 comprises a mainchain 106, a virtual machine partition 302, a private network 304, a virtual machine partition 306, a sidechain 308, a virtual machine partition 310, a virtual machine partition 314, a distributed application 316, a computing device 318, a computing device 320, and a distributed application 322.

The private network 304, further comprises a computing device 312, and a computing device 324.

The computing device 312 further comprises a virtual machine partition 314. The computing device 324 further comprises a virtual machine partition 310. The computing device 318 further comprises a virtual machine partition 306. The computing device 320 further comprises the virtual machine partition 302.

The distributed application 316 utilizes computing resources distributed across virtual machine partitions and is distributed across the virtual machine partition 302, the virtual machine partition 306, the virtual machine partition 314 and the virtual machine partition 310.

The distributed application 322 is distributed across the private network 304. The distributed application 322 utilizes computing resources distributed across virtual machine partitions and is distributed across the virtual machine partition 314 and the virtual machine partition 310.

The mainchain 106 is distributed across network nodes, the virtual machine partition 306 on the computing device 318, the virtual machine partition 302 on computing device 320 and the private network 304. The sidechain 308 is recorded to the mainchain 106. The mainchain 106 may be operated in a public network as well as in a private network such as private network 304.

On the private network 304, the sidechain 308 and the mainchain 106 are distributed across the virtual machine partition 314 on the computing device 312 and the virtual machine partition 310 on the computing device 324. The computing device 320, computing device 318, computing device 312 and computing device 324 may access the mainchain 106 publicly or privately.

A virtual machine partition within a computing device, e.g., a computer, creates a partition on each device to run the mainchain or sidechain. This assists in maintaining the integrity of an application running on the device.

Figure 4:
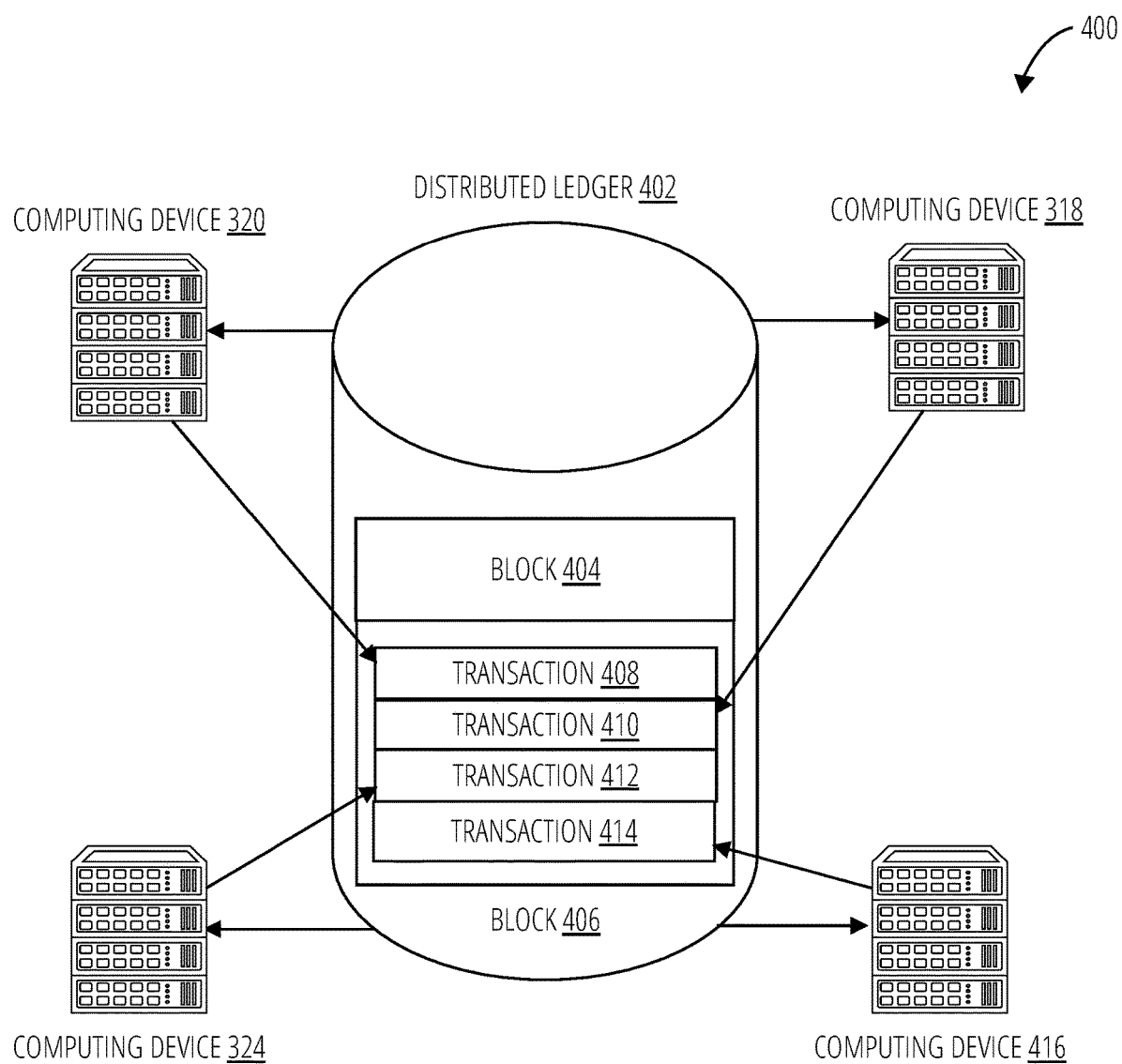
FIG. 4 illustrates an embodiment of a heterogeneous blockchain network 400.

Referencing FIG. 4, the heterogeneous blockchain network 400 comprises a distributed ledger 402, a computing device 320, a computing device 318, a computing device 416, and a computing device 324.

The distributed ledger 402 further comprises block 406 and block 404.

The block 406 further comprises a transaction 408, a transaction 410, a transaction 412, a transaction 414, The computing device 324 records transaction 412 to the block 406, the computing device 416 records the transaction 414 onto the block 406, the computing device 318 records the transaction 410 onto the block 406, and the computing device 320 records the transaction 408 onto the block 406. The distributed ledger 402 is distributed to the computing device 320, the computing device 318, the computing device 324 and the computing device 416. The distributed ledger 402 may comprise a sidechain 308. The distributed ledger 402 may comprise a mainchain 106.

Figure 5:
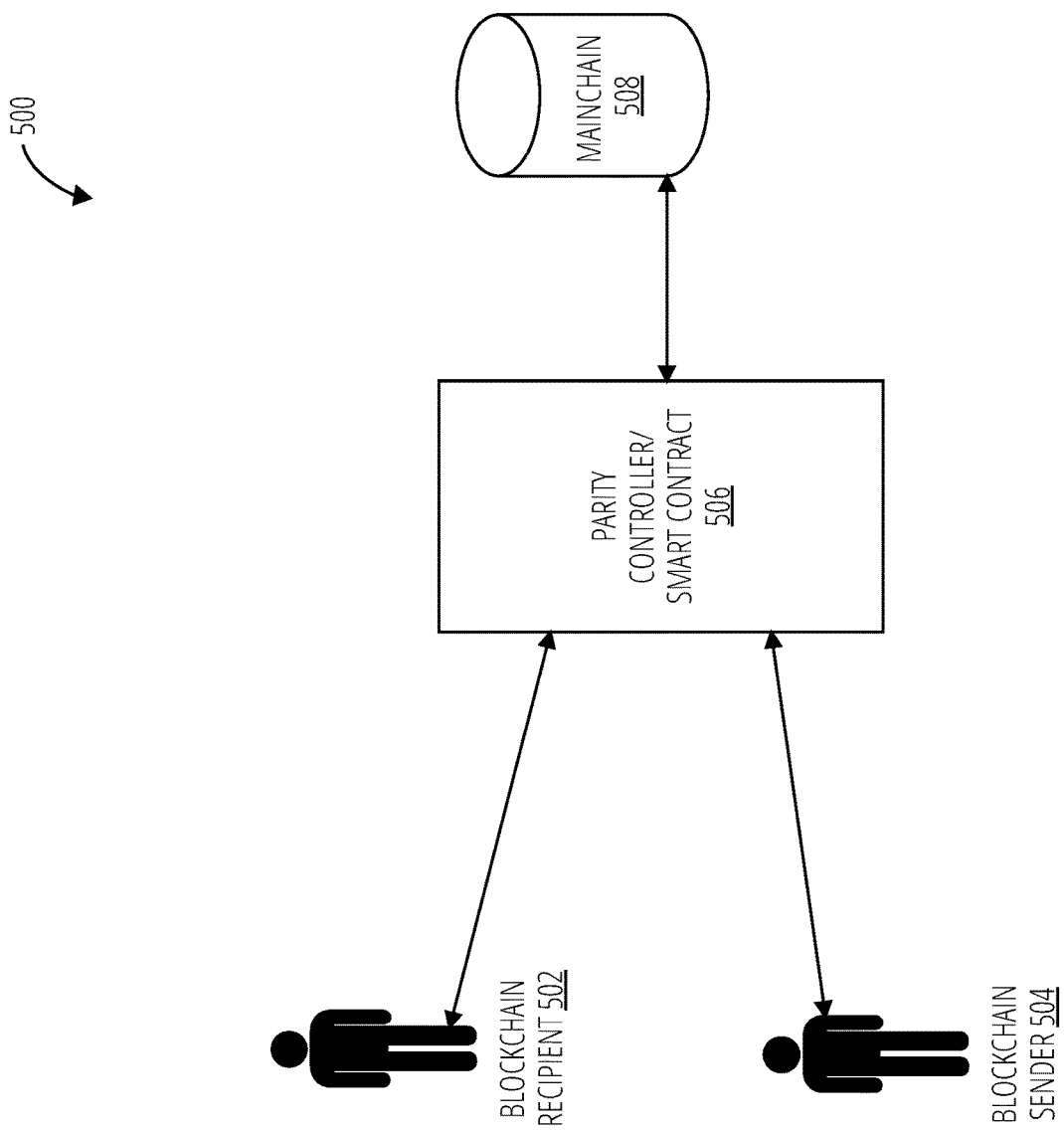
FIG. 5 illustrates an example 500 in accordance with one embodiment.

Referring to FIG. 5, example 500 shows a transaction using a parity controller/smart contract 506 acting as a connection mechanism between individual blockchains (Blockchain Recipient 502 and Blockchain Sender 504).

Blockchain Sender 504 and Blockchain Recipient 502 are trying to interact with each other and the application database running on a mainchain 508.

Figure 6:
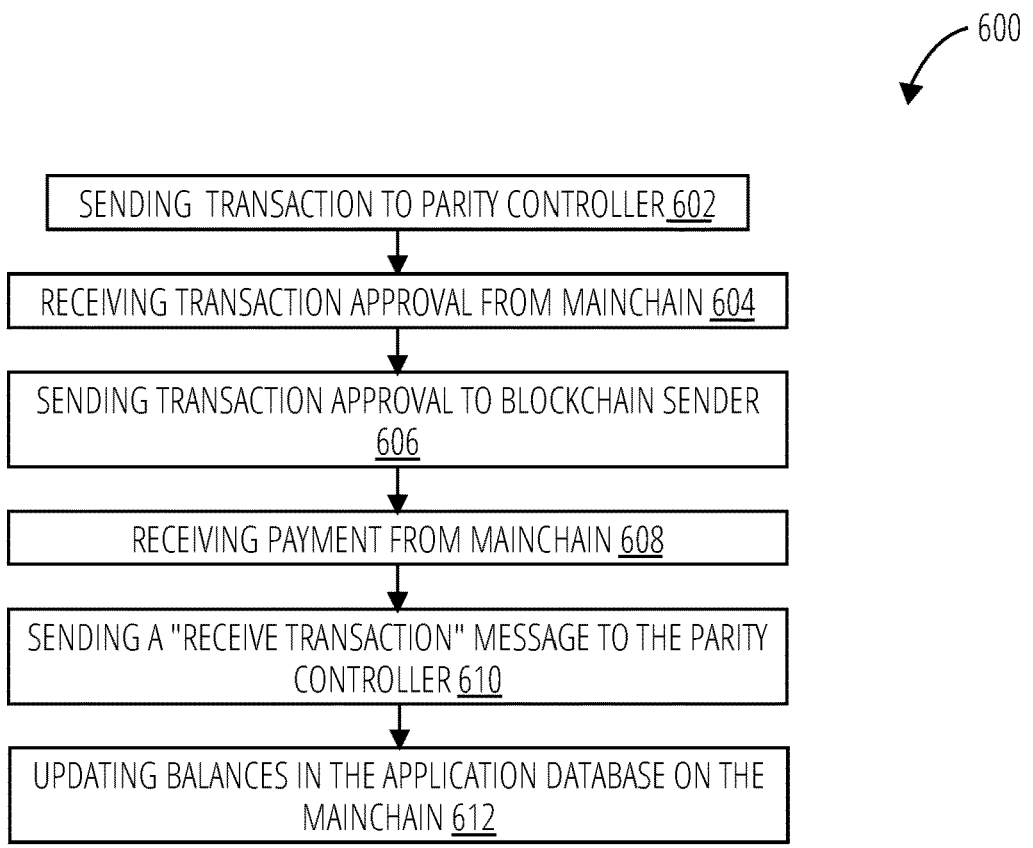
FIG. 6 illustrates a method 600 in accordance with one embodiment.

Referring to FIG. 6, method 600 shows steps involved in a transaction between a blockchain sender and a blockchain recipient.

The steps involve a blockchain sender sending a transaction to parity controller (block 602). The smart contract/parity controller receives transaction approval from the mainchain (block 604) and the smart contract/parity controller sends transaction approval to the blockchain sender (block 606). A blockchain recipient receives payment from the mainchain (block 608), and the blockchain recipient sends a "Receive transaction" message to the parity controller (block 610). The smart contract/parity controller updates balances in the application database on the mainchain (block 612).

Figure 7:
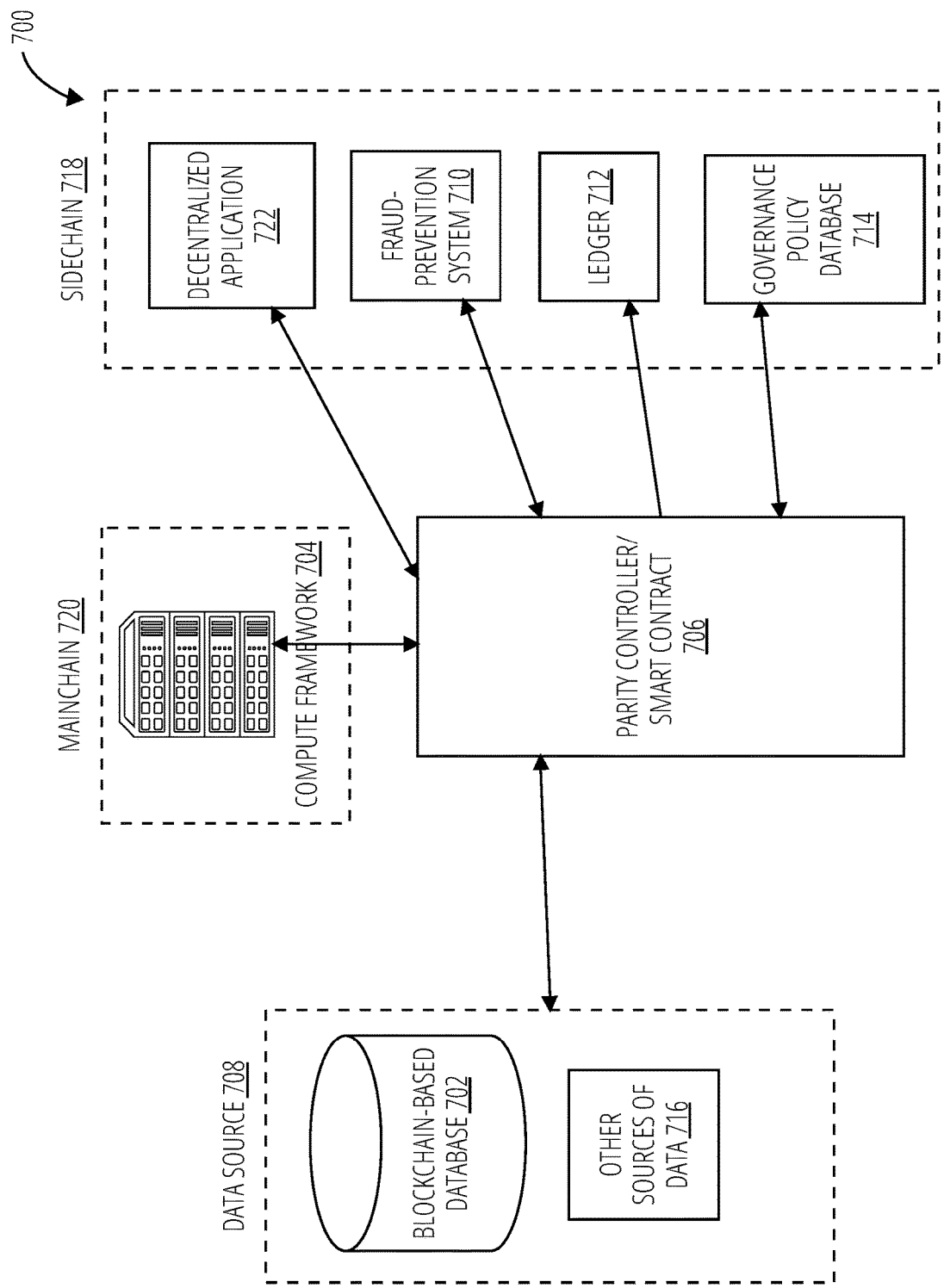
FIG. 7 illustrates a system 700 in accordance with one embodiment.

Referring to FIG. 7, system 700 shows an example of implementation of the methods of the disclosure used in a fraud prevention system of data by enabling a company or organization on the sidechain 718 to implement rules established by the company.

The data source 708 includes a data market place such as blockchain-based database 702, and other sources of data 716 with sidechains, where the sidechains provide data access to a parity controller/smart contract 706.

The parity controller/smart contract 706 may run a block of compute applications on the mainchain 720, such as a compute framework 704, if the sidechain 718 does not have enough compute power. The mainchain 720 executes that workload and provides access back to the sidechain 718.

In this example, the parity controller/smart contract 706 may be used to check the parity and to split up compute power among many different nodes on a network so that there is access to buy and sell compute power on the network.

The fraud-prevention system 710 is a system that records the validity of the data. The ledger 712 records the information, and the governance policy database 714 stores a set of rules to control the flow of data that are created by the business or the company. Every time a workload is submitted, the governance policy database 714 approves the workload based on the set of rules.

In an embodiment, a decentralized application 722 may also run on the sidechain 718.

Figure 8:
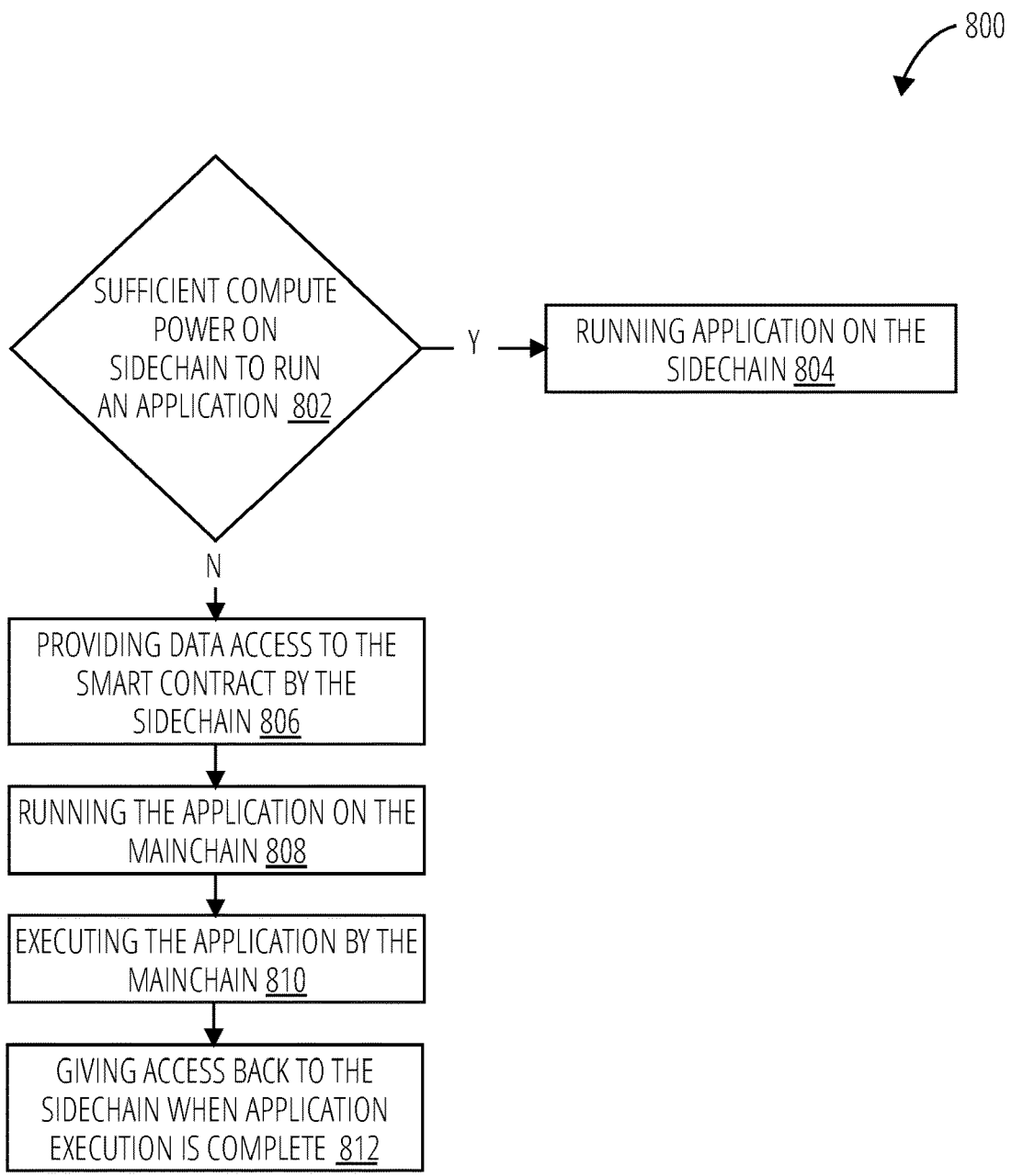
FIG. 8 illustrates a method 800 in accordance with one embodiment.

Referring to FIG. 8, method 800 shows steps involved in using the smart contract in splitting the compute power to run an application on the mainchain.

The steps involve determining if there is sufficient compute power on a sidechain to run an application (decision 802). If the compute power is sufficient, then the application is run on the sidechain (block 804). If the compute power is insufficient, then data access is provided to a smart contract by the sidechain (block 806), and the application is run on the mainchain (block 808) and executed by the mainchain (block 810). Access is granted to the sidechain when the application execution is complete (block 812).

As an example, in an Artificial Intelligence type solution, if a sidechain wants to execute machine learning on top of data but the sidechain does not have sufficient compute power available at this time, then the data may be sent to the mainchain application that offers to perform machine learning. The mainchain can execute the data and send it back to the sidechain.

Figure 9:
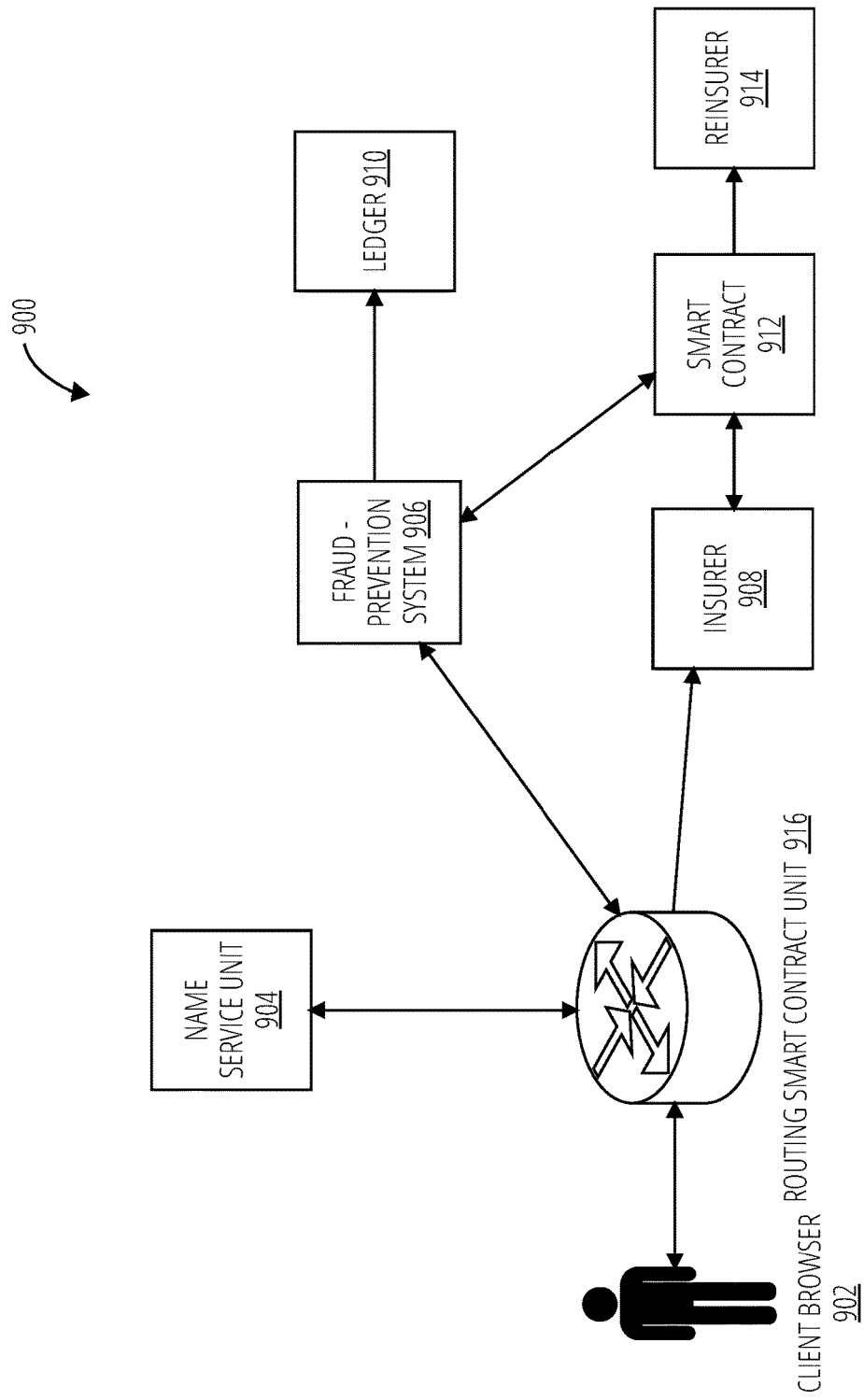
FIG. 9 illustrates a system 900 in accordance with one embodiment.

Referring to FIG. 9, system 900 shows an exemplary example of an insurance application on top of the blockchain.

The routing smart contract unit 916 acts like a parity controller and connection mechanism on a blockchain network. The client browser 902 may include an individual node on a sidechain trying to access the mainchain or an individual node trying to access the sidechain. When there is a request for an application, the role of the routing smart contract unit 916 is to route the correct data and application back to the client browser 902 or to the node trying to access it. Therefore, interacting across the block chains may enable accessing the right application.

Additionally, the smart contract has access to a distributed database such as a name service unit 904, which includes human readable names of public key addresses. Now the blockchains may be used with a domain name or a human readable name as opposed to having to use a public key or string for every transaction or every application usage. The name service unit 904 may be a decentralized system on a blockchain that enables the use of a human readable name or a domain name for an application.

In an example application of this disclosure, such as an insurance system, the process may be such that when a claim is submitted, the routing smart contract unit 916 routes the information to the fraud—prevention system 906. The fraud—prevention system 906 ensures that the submitted information is valid and accurate via the smart contract 912, and records the information in the ledger 910.

The smart contract 912 sends a claim notification to a reinsurer 914 to make the payment. The insurer 908 approves the claim, makes the payment, and the smart contract 912 and fraud—prevention system 906 are notified of the approval. The client browser 902 receives the application and content, which in this case may be the payment.

Figure 10:
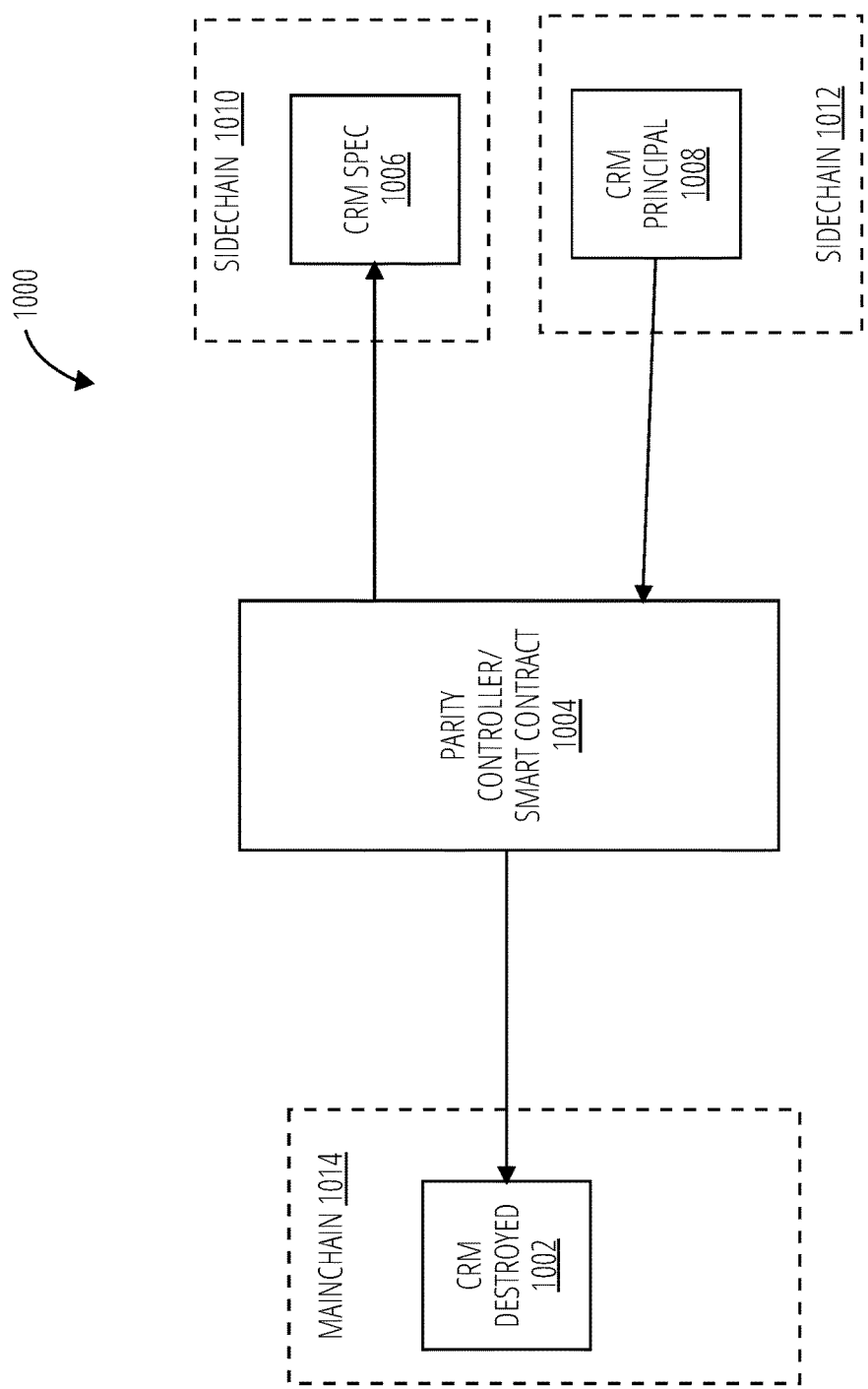
FIG. 10 illustrates an example 1000 in accordance with one embodiment.

Referring to FIG. 10, example 1000 shows an application of the methods and systems of the disclosure to manage the value of the cryptocurrency by using a parity controller/smart contract 1004. CREAM coin (CRM) is an example of a cryptocurrency that may be used in this application.

This example shows a system including two separate assets or tokens such as a stable asset, CRM principal 1008 in a sidechain 1010, and a speculative asset, CRM spec 1006, in a sidechain 1012.

A method to manage value of cryptocurrency is by using a smart contract that can manage by expanding and decreasing the money supply to manage the stability of the token or CRM. This invention provides a single medium for all the values to be exchanged between sidechain 1012 to the mainchain 1014 and to another sidechain 1012. For example, by having one central token that can be used across many different blockchains people may transact on the blockchain/sidechain with each other, using a stable cryptocurrency. The method also provides for destroying of CRM where CRM destroyed 1002 is destroyed in mainchain 1014.

Figure 11:
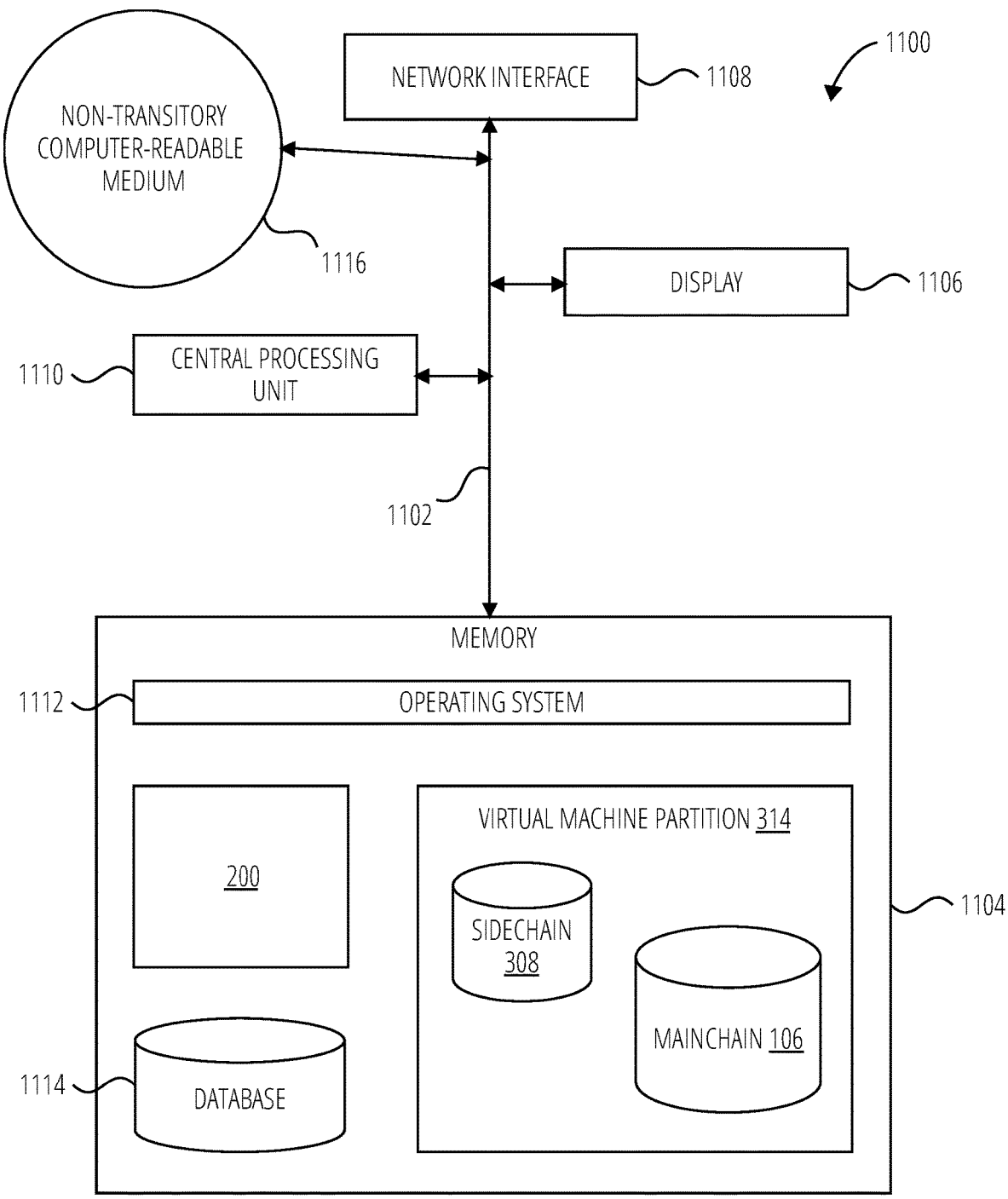
FIG. 11 illustrates a system 1100 in accordance with one embodiment.

FIG. 11 illustrates several components of an exemplary system 1100 in accordance with one embodiment. In various embodiments, system 1100 may include a desktop PC, server, workstation, mobile phone, laptop, tablet, set-top box, appliance, or other computing device or apparatus that is capable of performing operations such as those described herein. In some embodiments, system 1100 may include many more components than those shown in FIG. 11. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1100 may comprise one or more physical and/or logical devices that collectively provide the functionalities described herein. In some embodiments, system 1100 may comprise one or more replicated and/or distributed physical or logical devices.

In some embodiments, system 1100 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1100 includes a bus 1102 interconnecting several components including a network interface 1108, a display 1106, a central processing unit 1110, and a memory 1104.

Memory 1104 generally comprises a random-access memory ("RAM") and permanent non-transitory mass storage device, such as a hard disk drive or solid-state drive. Memory 1104 stores an operating system 1112.

These and other software components may be loaded into memory 1104 of system 1100 using a drive mechanism (not shown) associated with a non-transitory computer-readable medium 1116, such as a DVD/CD-ROM drive, memory card, network download, or the like.

Memory 1104 also includes database 1114. In some embodiments, system 1100 may communicate with database 1114 via network interface 1108, a storage area network ("SAN"), a high-speed serial bus, and/or via the other suitable communication technology.

In some embodiments, database 1114 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be affected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be affected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

Figure 12:
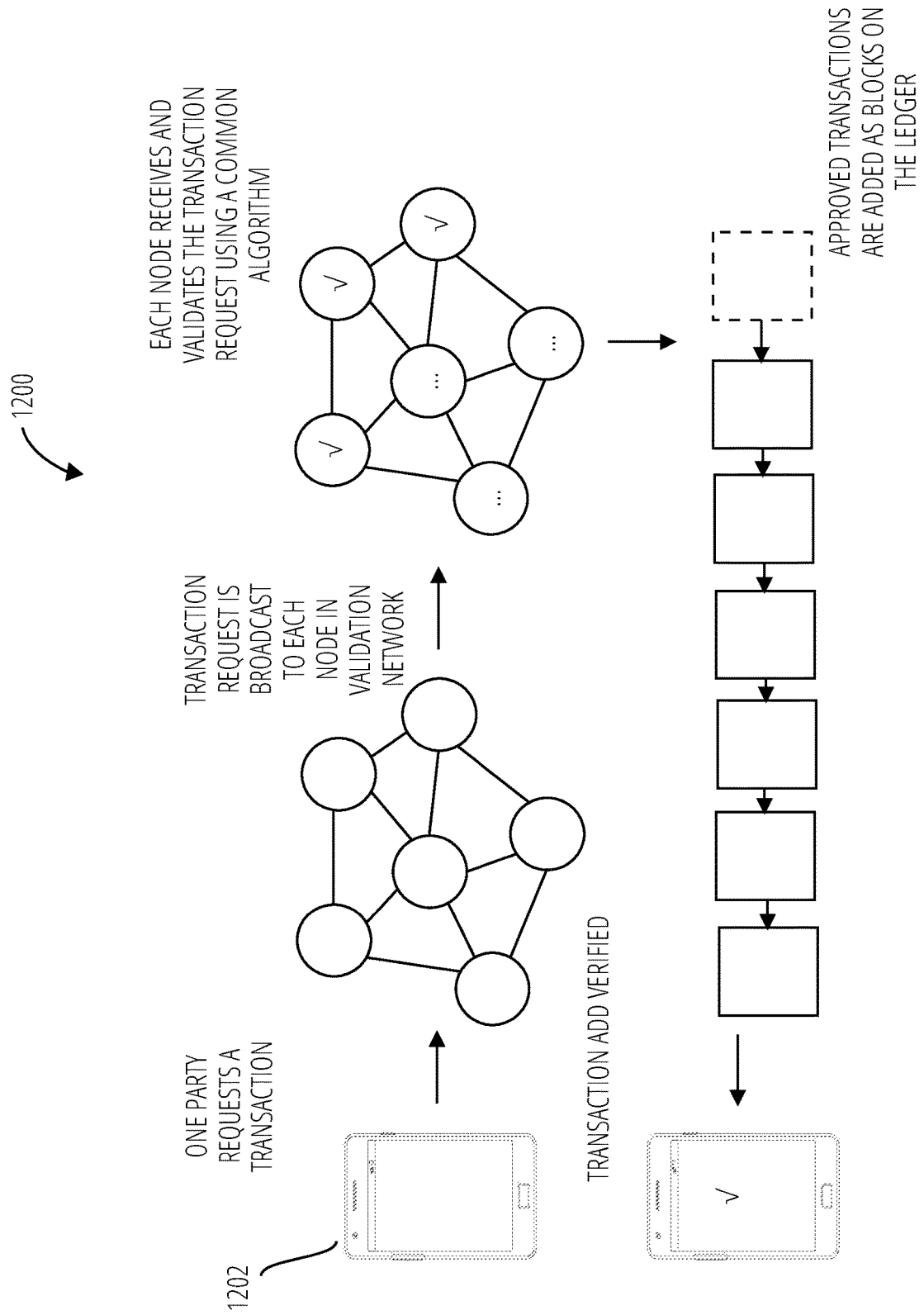
FIG. 12 illustrates a blockchain transaction process 1200 in accordance with one embodiment.

Referring to FIG. 12, a blockchain transaction process 1200 demonstrates that a blockchain is an ever-growing set of data blocks. Each block records a collection of transactions. Blockchains distribute these transactions across a group of computers. Each computer maintains its own copy of the blockchain transactions.

A blockchain is a continuously growing list of records, called blocks, which are linked and secured using cryptography. Each block typically comprises a cryptographic hash of the previous block, a timestamp, and transaction data. By design, a blockchain is resistant to modification of the data. Blockchains may implement an open, distributed ledger that can record transactions between two parties efficiently and in a verifiable and permanent way.

A blockchain is typically managed by multiple parties collectively adhering to a protocol for inter-node communication and validating new blocks. One party may use a transaction requesting device 1202 to initiate the transaction. Once recorded, the data in any given block cannot be altered retroactively without alteration of all subsequent blocks, which requires consensus among the operators.

Cryptography involving mathematical methods of keeping data secret and proving identity is utilized when recording transactions. One digital key ensures only an owner can enter a transaction to the blockchain involving their assets, and another digital key lets other parties confirm it really was the owner who added the transaction.

Blockchain is resistant to tampering or other changes by utilizing a cryptographic technique called the hash. Hashing reduces data to a sequence of seemingly random characters—for example, the hash of the phrase "the quick brown fox" is "9ECB36561341D18EB65484E833EFEA61EDC7-4B84CF5E6AE1B81C63533E25FC8F" using a hash method called SHA-256. Tweaking just one letter in the phrase produces a completely different hash, and you can't go backward to figure out the original data from the hash.

With blockchain, hashes are linked together so any minute change is immediately visible, not just for the block housing it but for all other blocks added later. With red flags that big for changes that small, auditing becomes easier.

Figure 13:
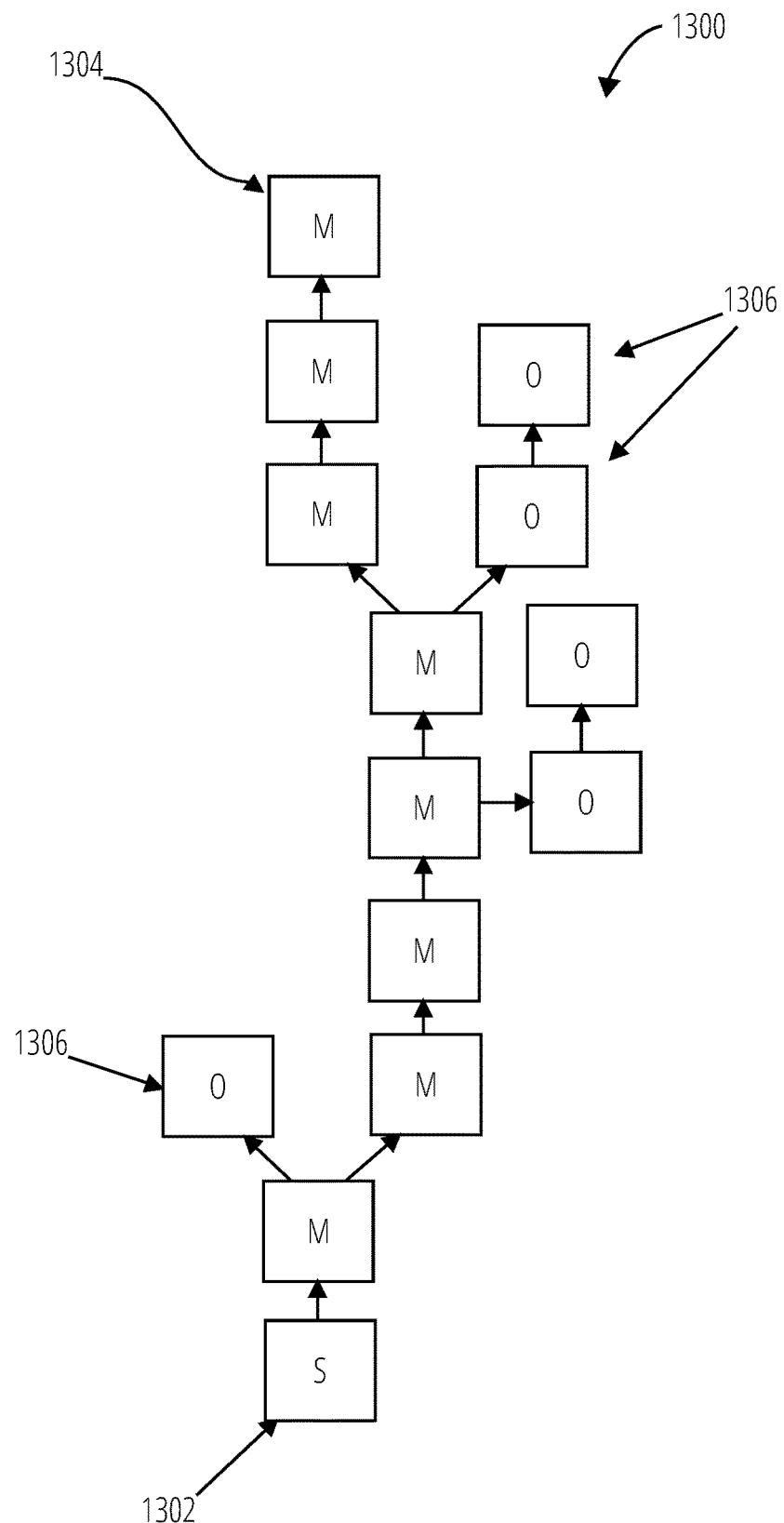
FIG. 13 illustrates a blockchain formation 1300 in accordance with one embodiment.

FIG. 13 illustrates an exemplary blockchain formation 1300. The mainchain 1304 (M blocks) comprises the longest series of blocks from the start block 1302 (S block) to the current block. Orphan blocks 1306 (O blocks) exist outside of the main chain.

Blocks hold batches of valid transactions that are hashed and encoded, for example into a Merkle tree. Each block includes the cryptographic hash of the prior block in the blockchain formation 1300, linking the two. The linked blocks form a chain. This iterative process confirms the integrity of the previous block, all the way back to the original start block 1302.

Sometimes separate blocks can be produced concurrently, creating a temporary fork. In addition to a secure hash-based history, the blockchain formation 1300 has a specified algorithm for scoring different versions of the history so that one with a higher value can be selected over others. Blocks not selected for inclusion in the mainchain 1304 are called orphan blocks 1306. Peers supporting the blockchain formation 1300 have different versions of the history from time to time. They keep only the highest-scoring version of the blockchain formation 1300 known to them. Whenever a peer receives a higher-scoring version (usually the old version with a single new block added) they extend or overwrite their local version of the blockchain formation 1300 and retransmit the improvement to their peers. There is never an absolute guarantee that any particular entry will remain in the best version of the history forever. Because blockchains are typically built to add the score of new blocks onto old blocks and because there are incentives to work only on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is always considered the valid one by the network. There are a number of methods that can be used to demonstrate a sufficient level of computation. Within a blockchain the computation is carried out redundantly rather than in the traditional segregated and parallel manner.

What is claimed is:
1. A method of implementing a blockchain network comprising:
receiving, with a public access controller, a plurality of public inputs to a mainchain from a plurality of networked nodes, the nodes comprising:

at least one computing device; and at least one a private network hosting a sidechain;

receiving with a private access controller an authentication token to enable private permissioned inputs to the sidechain, the sidechain being configured for operation independent of intervention from consensus logic;

receiving, with the consensus logic, the plurality of public inputs from the public access controller and a block hash from a previous block; and assembling the plurality of public inputs into a new block in the mainchain wherein a parity controller is employed between the mainchain and a plurality of sidechains to control parity between the mainchain and the plurality of sidechains, and each one of the sidechains has an individual instance of the private access controller associated with it.

2. The blockchain network of claim 1, wherein the private network hosting each one of the sidechains may be considered a single node in the blockchain network.

3. The blockchain network of claim 1, wherein data for the sidechains and the mainchain is stored in virtual environments on the nodes within the blockchain network.

4. The blockchain network of claim 3, wherein computing resources for the virtual environments on the nodes may be accessible by the blockchain network for the execution of distributed applications.

5. A computing apparatus, the computing apparatus comprising:

a processor; and a memory storing instructions that, when executed by the processor, configure the apparatus to:

receive with a public access controller, a plurality of public inputs to a mainchain from a plurality of networked nodes, the nodes comprising:

at least one computing device; and at least one a private network hosting a sidechain;

receive, with a private access controller an authentication token to enable private permissioned inputs to the sidechain, the sidechain being configured for operation independently of consensus logic;

receive, with the consensus logic, the plurality of public inputs from the public access controller and a block hash from a previous block; and assemble the plurality of public inputs into a new block in the mainchain, wherein a parity controller is employed between the mainchain and a plurality of sidechains to control parity between the mainchain and the plurality of sidechains, and each one of the sidechains has an individual instance of the private access controller associated with it.

6. The computing apparatus of claim 5, wherein the apparatus is configured to implement a blockchain network and the private network hosting each one of the sidechains may be considered a single node in the blockchain network.

7. The computing apparatus of claim 5, wherein the apparatus is configured to implement a blockchain network and data for the sidechains and the mainchain is stored in virtual environments on the node within the blockchain network.

8. The computing apparatus of claim 7, wherein the apparatus is configured to implement a blockchain network and computing resources for the virtual environments on the nodes may be accessible by the blockchain network for the execution of distributed applications.

* * * * *